(12) United States Patent
Kitaoka et al.

(10) Patent No.: US 7,103,076 B2
(45) Date of Patent: Sep. 5, 2006

(54) ULTRASHORT PULSED LASER AND OPTICAL HEAD USING THE SAME

(75) Inventors: Yasuo Kitaoka, Ibaraki (JP); Kazuhisa Yamamoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 400 days.

(21) Appl. No.: 10/691,740

(22) Filed: Oct. 22, 2003

(65) Prior Publication Data

US 2004/0086005 A1 May 6, 2004

(30) Foreign Application Priority Data

Oct. 24, 2002 (JP) ............... 2002-309350

(51) Int. Cl.
*H01S 3/10* (2006.01)
*H01S 3/11* (2006.01)

(52) U.S. Cl. ......................... 372/25; 372/10

(58) Field of Classification Search ............ 372/10–18, 372/25–28
See application file for complete search history.

(56) References Cited

U.S. PATENT DOCUMENTS

| | | | | |
|---|---|---|---|---|
| 5,448,579 A | * | 9/1995 | Chang et al. | 372/6 |
| 5,450,427 A | * | 9/1995 | Fermann et al. | 372/10 |
| 5,627,848 A | * | 5/1997 | Fermann et al. | 372/18 |
| 5,880,877 A | * | 3/1999 | Fermann et al. | 359/341.31 |
| 6,034,975 A | * | 3/2000 | Harter et al. | 372/18 |
| 6,072,811 A | * | 6/2000 | Fermann et al. | 372/11 |
| 6,252,892 B1 | * | 6/2001 | Jiang et al. | 372/11 |
| 6,373,867 B1 | * | 4/2002 | Lin et al. | 372/18 |
| 6,570,892 B1 | * | 5/2003 | Lin et al. | 372/6 |
| 6,813,429 B1 | * | 11/2004 | Price et al. | 385/125 |
| 6,819,689 B1 | * | 11/2004 | Yoshida et al. | 372/6 |
| 6,822,978 B1 | * | 11/2004 | Kafka et al. | 372/18 |
| 2002/0064353 A1 | | 5/2002 | Yokoyama | |
| 2003/0202547 A1 | * | 10/2003 | Fermann et al. | 372/6 |

FOREIGN PATENT DOCUMENTS

JP 8-213680 8/1996

\* cited by examiner

*Primary Examiner*—James Menefee
*Assistant Examiner*—Phillip Nguyen
(74) *Attorney, Agent, or Firm*—Hamre, Schumann, Mueller & Larson, P.C.

(57) ABSTRACT

An ultrashort pulsed laser device includes: a pump laser diode having linear polarization; a solid laser medium oscillating with linear polarization; an optical fiber maintaining a polarization direction; and a saturable absorber mirror. The solid laser medium is disposed between the optical fiber and the saturable absorber mirror. Laser light emitted from the pump laser diode optically is coupled with a first end face of the optical fiber, and laser light emitted from a second end face of the optical fiber pumps the solid laser medium. The first end face of the optical fiber and the saturable absorber mirror constitute a laser resonator. With this configuration, mode lock can be realized stably at a repetition frequency of several hundred MHz.

7 Claims, 5 Drawing Sheets

ULTRASHORT PULSED LASER AND OPTICAL HEAD USING THE SAME

BACKGROUND OF THE INVENTION

1. Field of the Invention

The present invention relates to an ultrashort pulsed laser device used in an optical communication field and an optical information processing field.

2. Related Background Art

Three-dimensional bit-by-bit recording, which is a technology expected as next generation high-density and high-capacity recording, exploits a non-linear effect such as a multiphoton process. When ultrashort pulsed laser with a pulse width in femtoseconds is collected onto a glass, an organic material and the like that are transparent with respect to laser light applied in a normal state using a lens, a transition probability of the absorption changes in proportion to the square of a light intensity, thus generating optical absorption. Thereby, the absorption spectrum can be changed by, for example, changing diarylethene from an open ring to a closed ring. Since the material is transparent with respect to laser light, it can be made a multilayer along a laminated direction, whereby optical recording can be increased in capacity.

Such three-dimensional bit-by-bit recording requires an ultrashort pulsed laser. FIG. 9 shows an example of a femtosecond laser as an ultrashort pulsed laser light source. In this device, laser light from a pump laser 60 is collected onto a solid laser medium 63 via a mirror 61 and a concave mirror 62. Between a saturable absorber mirror 64 and an output mirror 65, a resonator is constituted. The saturable absorber mirror 64 is used for mode lock. A prism pair 66 and 67 is aimed for dispersion compensation. Cr: forsterite (pumping wavelength: 1.06 µm, oscillation wavelength: 1.3 µm) is used as the solid laser medium 63, and a Nd: YAG laser (wavelength: 1.06 µm) is used as the pump laser 60, whereby ultrashort pulsed light of 20 fs is obtained.

Assuming that an average power, a repetition frequency, a pulse width and a peak power of this ultrashort pulsed light are Pc, f, t and Pp, respectively, energy E of one pulse is represented as follows:

$$E = Pc/f(J).$$

And, the peak power Pp is represented as follows:

$$Pp = E/t(W).$$

Pc depends on the power of the pump laser. To accommodate household electronic appliances, the pump laser has to be not more than 1 W. Therefore, in order to increase Pp, the repetition frequency f and the pulsed width should be decreased. Meanwhile, in order to apply the ultrashort pulsed laser to optical recording, for example, a considerable degree of data transfer rate is required, so that a repetition frequency of not less than several hundred MHz is required. In order to realize the peak power of 1 kW by 1-watt pumping, the pulse width needs to be made to be about 10 picoseconds.

As one way for decreasing the pulse width, the mode lock is preferable. According to this method, the phase of the pulse is made uniform by changing gain and loss of the resonator in synchronization with a timing of one reciprocating motion of the laser light through the resonator. Methods for the mode lock include active-type mode lock utilizing an AO element and an EO element and passive-type mode lock utilizing a saturable absorber and a Kerr effect. A relationship between a frequency v of the mode lock and a resonator length d is represented as follows:

$$v = c/2d$$

where c denotes the speed of light. Therefore, in order to realize the mode lock at the period of 100 MHz, the resonator length has to be set at 1.5 m. For that reason, the optical system becomes complicated as shown in FIG. 9, which causes a problem of increasing the size of the device, as well as a problem with reliability in view of the displacement and contamination of optical components.

In addition, there is a known ultrashort pulsed laser device as described in JP H08(1996)-213680 A in which an optical fiber is interposed in an optical path of a resonator. The use of the optical fiber allows a decrease in the number of optical components and the number of portions to be adjusted optically. However, in terms of a stability of the power by the mode lock and a simplification of the configuration, a sufficient practical device has not been realized.

SUMMARY OF THE INVENTION

Therefore, with the foregoing in mind, it is an object of the present invention to provide an ultrashort pulsed laser device having a simple and small configuration, by which a stable power can be obtained.

An ultrashort pulsed laser device having a first configuration of the present invention includes: a pump laser diode having linear polarization; a solid laser medium oscillating with linear polarization; an optical fiber maintaining a polarization direction; and a saturable absorber mirror. The solid laser medium is disposed between the optical fiber and the saturable absorber mirror. Laser light emitted from the pump laser diode optically is coupled with a first end face of the optical fiber, and laser light emitted from a second end face of the optical fiber pumps the solid laser medium. The first end face of the optical fiber and the saturable absorber mirror constitute a laser resonator.

An ultrashort pulsed laser device having a second configuration of the present invention includes: a pump laser diode having linear polarization; a waveguide solid laser medium formed on a ferroelectric crystal substrate, which oscillates with linear polarization and has a waveguide loss controlling unit; and an optical fiber maintaining a polarization direction. A first end face of the optical fiber and a first end face of the waveguide solid laser medium are opposed so as to optically couple with each other. Laser light emitted from the pump laser diode is coupled with a second end face of the optical fiber or a second end face of the waveguide solid laser medium so as to pump the waveguide solid laser medium. The second end face of the optical fiber and the second end face of the waveguide solid laser medium constitute a laser resonator.

An optical head having a first configuration of the present invention includes the ultrashort pulsed laser device with the first configuration. The ultrashort pulsed laser device is provided with a power output unit, and the optical fiber is disposed between the power output unit and the pump laser diode. The pump laser diode is fixed to a heat sink mount and the power output unit is fixed to an optical head mount that is provided separately from the heat sink mount.

An optical head having a second configuration of the present invention includes an ultrashort pulsed laser that includes a pump laser diode having linear polarization; an optical fiber to which a transition element is doped; and a saturable absorber mirror. The ultrashort pulsed laser is provided with a power output unit, and the optical fiber is disposed between the power output unit and the pump laser diode. The pump laser diode is fixed to a heat sink mount and the power output unit is fixed to an optical head mount that is provided separately from the heat sink mount.

DETAILED DESCRIPTION OF THE INVENTION

Figure 1:
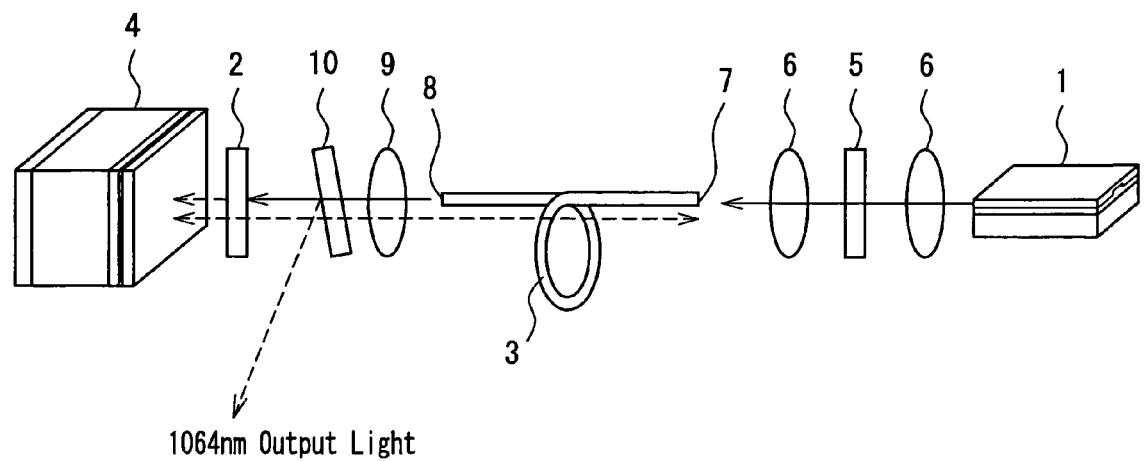
FIG. 1 schematically shows a configuration of an ultrashort pulsed laser device of Embodiment 1 of the present invention.

The ultrashort pulsed laser device having the first configuration of the present invention includes: a pump laser diode having linear polarization; an optical fiber maintaining a polarization direction; a solid laser medium oscillating with linear polarization; and a saturable absorber mirror. With this configuration, a resonator length can be set at 1 m or more with a compact configuration, short pulsed light of picoseconds or shorter can be generated with respect to a repetition frequency of 100 MHz because the mode lock occurs, and a sufficient peak power can be obtained easily. In addition, the use of a solid laser medium oscillating with linear polarization and a fiber maintaining a polarization direction allows a polarization direction of laser light oscillating in a resonator to be preserved as linear polarization. This is advantageous for the mode lock and a high peak power can be obtained because of stable and high-efficiency oscillation.

In the ultrashort pulsed laser device with the first configuration, it is preferable that a dielectric multilayer film is formed on the first end face of the optical fiber, the dielectric multilayer film having a low reflectance with respect to light from the pump laser diode and having a high reflectance with respect to light oscillating in the laser resonator. As the optical fiber, a photonic fiber may be used. Preferably, the solid laser medium is composed of Nd:YVO$_4$, Nd:GdVO$_4$ or Cr:LiSAF.

The ultrashort pulsed laser device with the second configuration of the present invention employs a waveguide solid laser medium having a waveguide loss controlling unit instead of a combination of the solid laser medium and the saturable absorber mirror in the first configuration. The waveguide loss controlling unit can make a loss of an optical waveguide, i.e., a loss of a resonator controllable, which enables the functioning of mode lock. With this configuration, the same effects as those of the first configuration can be obtained.

In the ultrashort pulsed laser device having the second configuration, the waveguide loss controlling unit may be constituted with a directional coupler formed on the ferroelectric crystal substrate. The waveguide solid laser medium may include a wavelength conversion unit.

The optical head having the first or the second configuration of the present invention is configured so that the pump laser diode and the power output unit are fixed to different mounts. Therefore, a structure including the power output unit out of the elements constituting the optical head can be designed as compact and lightweight.

In the optical head of the present invention, the power output unit may be configured with the saturable absorber mirror.

An optical information processor for recording and reproducing information with respect to a recording medium can be configured so as to include: the optical head with any one of the configurations according to the present invention; an optical system for introducing light emitted from the short pulsed laser in the optical head to the recording medium; and an optical system for detecting light reflected from the recording medium.

Embodiment 1

The following describes an ultrashort pulsed laser device of Embodiment 1 of the present invention, with reference to FIG. 1. This ultrashort pulsed laser device includes a pump laser diode 1, a solid laser medium 2, an optical fiber 3 and a saturable absorber mirror 4. Laser light emitted from the pump laser diode 1 is coupled with a first end face 7 of the optical fiber 3 by means of two lenses 6 with a bandpass filter 5 interposed therebetween. Laser light emitted from a second end face 8 of the optical fiber 3 passes through a lens 9 and an output mirror 10 so as to be collected onto the solid laser medium 2, where pumping occurs. The laser light passing through the solid laser medium 2 is reflected from the saturable absorber mirror 4. The saturable absorber mirror 4 and the first end face 7 of the optical fiber 3 constitute a laser resonator.

The ultrashort pulsed laser of this embodiment is intended for obtaining characteristics of a repetition frequency of several hundred MHz, a pulse width not more than 10 ps and a peak power of about 1 to 10 kW. In order to satisfy these characteristics, the device is configured so as to obtain mode lock with the saturable absorber mirror. Since the mode lock is generated passively by the saturable absorber mirror, short pulsed laser of picoseconds or less can be generated with respect to the repetition frequency of several hundred MHz. In addition, in order to set the repetition frequency at several hundred MHz, a resonator length needs to be set at about 1 meter. The optical fiber 3 has about a 1-meter resonator length and is effective for a compact configuration of the device.

As the pump laser diode 1, for example, an AlGaAs based laser diode with a wavelength of 808 nm and an output power of 200 mW and with a single stripe may be used. As the solid laser medium 2, for example, a-axis cut and 3 at. % doped Nd:YVO$_4$ may be used. As the optical fiber 3, for example, a polarization-maintaining fiber with a length of 1.5 m may be used. The optical fiber 3, for example, is rolled into φ 50 mm so as to be arranged compactly. As the output mirror 10, a normal dielectric multilayered mirror may be used so as to have characteristics of a transmittance of 95% and a reflectance of 5%. The output mirror 10 is provided so as to have a tilt at 45° with respect to the optical axis, for example.

The bandpass filter 5 is used for stabilizing the oscillation wavelength of the pump laser diode 1. The bandpass filter 5 has characteristics of a full width at half maximum of transmission spectrum of 1 nm and a transmittance of 90%. On the first end face 7 of the optical fiber 3, which is on an incident side of the laser light from the pump laser diode 1, a multilayered film is formed so as to have a reflectance of 5%, for example, with respect to the wavelength of 808 nm of the pump laser diode 1 and so as to serve as a high reflectance coating that has a reflectance of 99.9%, for example, with respect to the oscillation wavelength 1,064 nm of Nd:YVO4 as the solid laser medium 2. The output mirror 10 has a reflectance of 5% with respect to the wavelength of 1,064 nm.

A part of the light with the wavelength of 808 nm is reflected from the first end face 7 so as to be fed back to the pump laser diode 1, and therefore such a wavelength is fixed at a central wavelength of the transmission spectrum of the bandpass filter 5 (in this case, absorption wavelength 808 nm of Nd:YVO$_4$).

On the second end face 8 of the optical fiber 3 on an outgoing side of the laser light, a multilayered film is formed so as to serve as an anti-reflection coat with respect to the wavelengths of 808 nm and 1,064 nm. Collimation adjustment of the lens 9 and orthogonality adjustment of the saturable absorber mirror 4 with respect to the optical axis are conducted so as to configure a laser resonator with the saturable absorber mirror 4 and the first end face 7 of the optical fiber 3.

Figure 2:
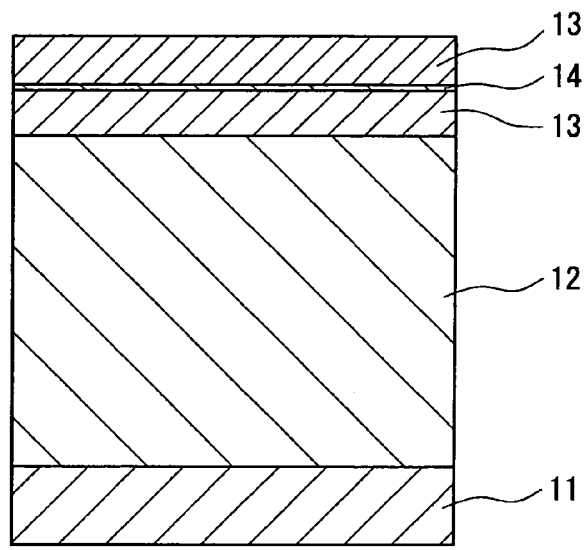
FIG. 2 is a cross-sectional view of a semiconductor saturable absorber mirror used in the above ultrashort pulsed laser device.

The saturable absorber mirror 4 will be described in the following. As the saturable absorber mirror 4, for example, a semiconductor saturable absorber mirror (SESAM) may be used. The SESAM has the features of exhibiting saturable characteristics such that the absorption decreases when light with a certain degree or more of power is incident and of having a quick absorption-recovery time around several hundred fs. As shown in FIG. 2, the SESAM has a configuration in which a reflecting layer 12 and a saturable absorber layer 14 sandwiched between buffer layers 13 are formed on a GaAs substrate 11.

The reflecting layer 12 is formed with a DBR grating made of AlAs/GaAs, which is formed by MOCVD (metal organic chemical vapor deposition). The buffer layers 13 are composed of InAlAs layers and the saturable absorber layer 14 is constituted with a multiple quantum well made of InGaAs/GaAs. A Bragg mirror preferably is designed so that a reflectance of the mirror becomes 100%. A saturated optical power, which is a power when the saturation is achieved, is 100 µJ/cm$^2$ as one example and a reflectance change of 10% can be obtained. The SESAM is fixed to a copper heat sink, which is not illustrated.

In this embodiment, a uniaxial crystal Nd:YVO$_4$ is used as the solid laser medium 2 and a polarization-maintaining fiber is used as the optical fiber 3. Thus, a polarization direction of the laser light of 1,064 nm that oscillates in the resonator is preserved as linear polarization, and therefore this embodiment is effective for the mode lock also.

In the optical fiber, phase delay occurs at a peak portion due to an effect of self-phase modulation, and therefore the wavelength of the first half of a pulse shifts to a long-wavelength side and the second half of the pulse shifts to a short-wavelength side. In a fiber with negative wavelength dispersion (abnormal dispersion), a group velocity of the light becomes slower at a longer wavelength. As a result, the group velocity becomes slow in the first half of a pulse and fast in the second half, resulting in narrowing of the time waveform of the pulse. In this embodiment also, a pulse is compressed due to the above-stated non-linear effect, so that this embodiment is effective for making a pulse shorter.

In an example of the ultrashort pulsed laser device according to this embodiment, 150 mW out of 200 mW of the power of the pump laser diode 1 coupled with the optical fiber 3. Then, the light of 1,064 nm was obtained at an average power of 50 mW from the output mirror 10. In addition, the mode lock was obtained at the frequency of 100 MHz, where the pulse width was 500 fs and the peak power was 1 kW.

This embodiment is characterized in that polarized light can be preserved and mode lock oscillation can be conducted with high efficiency, because Nd:YVO$_4$ as the solid laser medium 2 has a characteristic of linear polarization oscillation and the optical fiber 3 is a polarization-maintaining fiber. Additionally, since the saturable absorber mirror 4 and the optical fiber 3 are used, a compact and stable configuration can be realized as compared with the conventional configurations. Furthermore, since it is equipped with an optical feed-back function, a wavelength of the pump laser diode 1 can be fixed stably at the absorption wavelength of Nd:YVO$_4$ as the solid laser medium 2, so that laser oscillation can be carried out with high efficiency.

By carrying out wavelength conversion of the 1,064-nm ultrashort pulsed laser that is obtained by the device according to this embodiment, ultrashort pulsed light with a shorter wavelength can be obtained. As the wavelength conversion element, a KTiPO$_4$ crystal and the like can be used. The configuration of FIG. 1 can be made an internal resonator type by inserting a KTiPO4 crystal between the solid laser medium 2 and the optical fiber 3. When the thus obtained ultrashort pulsed light of 532 nm is used for optical recording, a highly sensitive material can be selected.

Although Nd:YVO$_4$ is used as the solid laser medium 2 in the above-described configuration, solid laser media such as Cr:LiSAF can be used. Thereby, oscillation can be carried out at an 800-nm band by pumping with a red AlGaInP pump laser diode, whereby a compact short pulsed laser can be realized. In addition, Nd:GdVO$_4$ can be used as well. In any solid laser medium, oscillation of linear polarization can be accomplished.

In addition, in the above-described configuration, the optical fiber 3 is placed between the pump laser diode 1 and the saturable absorber mirror 4, from each of which heat can be dissipated individually, and therefore a stable and reliable resonator can be configured. Especially, a temperature of the laser diode 1 can be kept stable, so that the wavelength thereof can be stabilized, resulting in the pumping efficiency of the solid laser medium 2 being kept stably.

The ultrashort pulsed laser device according to this embodiment can be used for a recording/reproducing system that performs three-dimensional bit-by-bit recording exploiting two-photon absorption, for example. As a recording material, diarylethene may be used, for example. When this recording material is irradiated with ultraviolet light having a wavelength not more than 400 nm, the material is colored blue, and when this is irradiated with visible light (not less than 500 nm), the material returns to the original state. When this material is irradiated with femtosecond laser light (peak power: 2 kW, pulse width: 150 fs, average repetition: 80 MHz, average power: 25 mW) using a Ti:Al$_2$O$_3$ laser with a wavelength of 780 nm, the material is colored blue because of two-photon absorption. Since the material originally does not absorb the light with a wavelength of 780 nm, pits can be formed three-dimensionally within a crystal. In addition, the two-photon absorption occurs only at a high light intensity region, miniscule pits can be formed.

By changing the configuration of diarylethene, a material can be designed so as to be changed green by irradiation with visible light not more than 500 nm and return to the original state by irradiation with red light. In addition, a further highly sensitive material also has been developed recently so that a material capable of recording at a peak power not more than 1 kW also is available.

Embodiment 2

An ultrashort pulsed laser device of Embodiment 2 will be described below, with reference to FIG. 3. This device is an example to adopt a directly coupling method that does not use a coupling lens system. In this drawing, the same reference numerals are assigned to the same elements as those in FIG. 1.

A pump laser diode 1 is mounted on a Si submount with a V-shaped groove formed therein so that an active layer of the pump laser diode faces the Si submount surface. In the V-shaped groove, an optical fiber 3 also is fixed. According to this embodiment, a saturable absorber mirror 15 composed of a SESAM is used as an output mirror. A resonator with a wavelength of 1,064 nm is configured with a first end face 7 of the optical fiber 3 and the saturable absorber mirror 15, which is similar to the configuration of FIG. 1. A Bragg mirror is designed so that a reflectance of the saturable absorber mirror 15 becomes 90%. The saturated optical power obtained for the saturable absorber mirror 15 was 100 $\mu J/cm^2$ and a reflectance change was 10%. Although the saturable absorber mirror 15 is fixed to a copper heat sink (not illustrated) in this example, a hole is bored in the central portion of the heat sink because the saturable absorber mirror 15 in this embodiment is used as the output mirror.

In an example of the ultrashort pulsed laser device according to this embodiment, 100 mW out of 200 mW of the power of the pump laser diode 1 coupled with the optical fiber 3. Then, the light of 1,064 nm was obtained at an average power of 20 mW from the saturable absorber mirror 15. In addition, the mode lock was obtained at the frequency of 100 MHz, where the pulse width was 500 fs and the peak power was 400 W.

According to the configuration of this embodiment, although the oscillation efficiency is reduced as compared with the configuration of FIG. 1, an output mirror and a coupling lens system for the pump laser diode 1 are unnecessary. Therefore, the configuration is stable and compact with a reduced number of components, thus having a practical usefulness.

Embodiment 3

An ultrashort pulsed laser device of Embodiment 3 will be described below, with reference to FIG. 4. In this embodiment, in addition to the pumping of $Nd:YVO_4$ as the solid laser medium 2 via the optical fiber 3 as in the configurations of FIGS. 1 and 3, pumping light that is applied from a slanting position by a second pump laser diode 16 is collected by lenses 17 and 18. With this configuration, a higher power can be obtained. When the solid laser medium 2 is a waveguide type, pumping can be carried out by a high-powered laser diode with a wide stripe, and therefore a further higher power can be expected.

Figure 3:
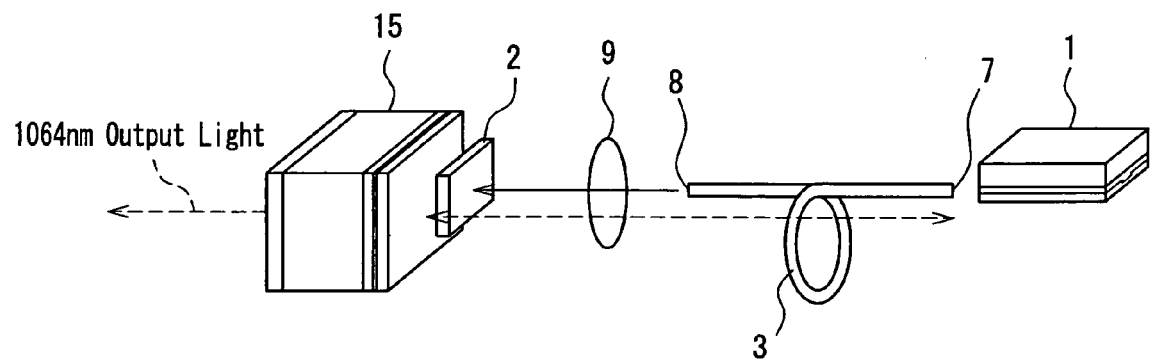
FIG. 3 schematically shows a configuration of an ultrashort pulsed laser device of Embodiment 2 of the present invention.
Figure 4:
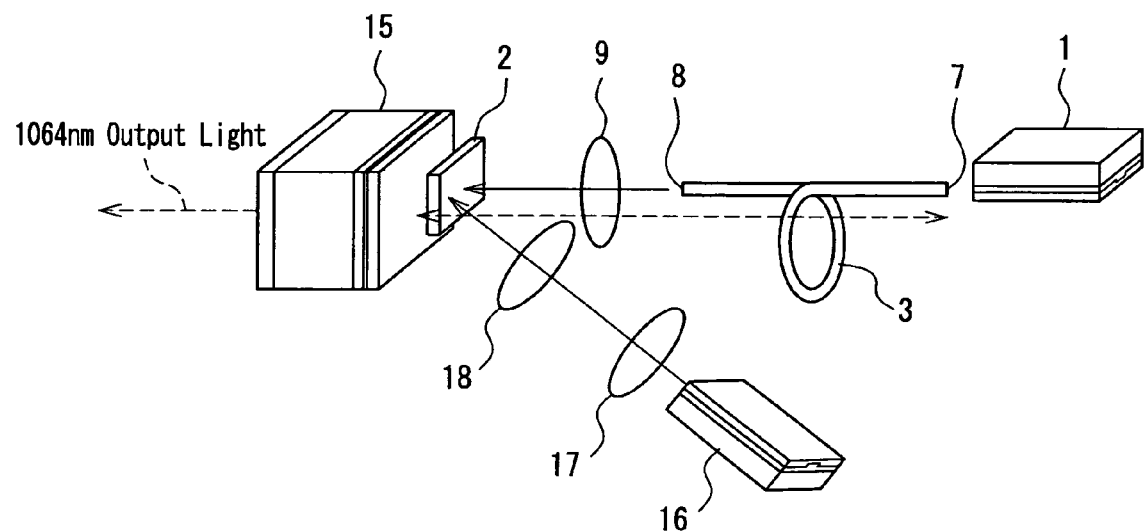
FIG. 4 schematically shows a configuration of an ultrashort pulsed laser device of Embodiment 3 of the present invention.

As stated above, in the configurations of the ultrashort pulsed laser devices shown in FIGS. 1, 3 and 4, the use of the optical fiber 3 allows a long resonator to be miniaturized and the mode lock frequency can be set at several hundred MHz, which is suitable for an optical recording/reproducing system. As a result, a high power at a kW level and a short pulse at a picosecond level can be realized at the same time, thus having a practical usefulness.

Note here that, instead of the configuration as shown in FIGS. 1, 3 and 4 where the solid laser medium 2 is arranged between the optical fiber 3 and the saturable absorber mirror 4 or 15, an optical fiber may be arranged between the solid laser medium 2 and the saturable absorber mirror 4 or 15, which also can provide ultrashort pulsed light. In this case, however, a resonator is configured with an end face of the solid laser medium 2 and the saturable absorber mirror 4 or 15, and therefore the number of axes to be adjusted in the resonator will be increased.

Embodiment 4

An ultrashort pulsed laser device of Embodiment 4 will be described below, with reference to FIG. 5. The device of this embodiment has the same configuration as those indicated in FIGS. 1, 3 and 4. However, as the optical fiber 3, a photonic fiber is used instead of the polarization-maintaining fiber so as to keep a polarization direction.

Figure 5:
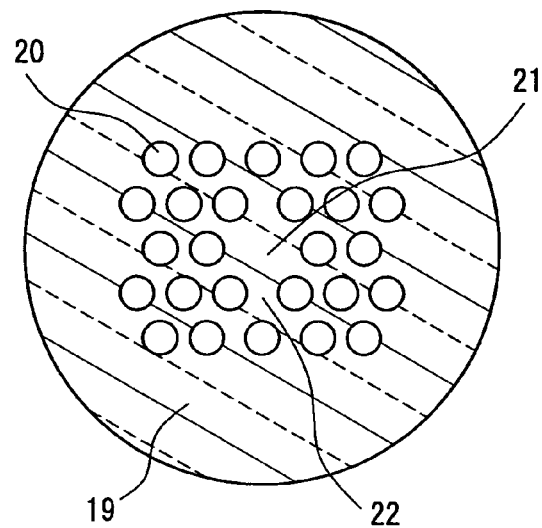
FIG. 5 is a cross-sectional view of a photonic fiber used in an ultrashort pulsed laser device of Embodiment 4 of the present invention.

FIG. 5 is a cross-sectional shape of the photonic fiber. In silica ($SiO_2$) 19 making up the fiber, a periodic air holes 20 are formed. Apart of regions where the air holes 20 are not formed serves as a core 21. Depending on a diameter d and a period $\Lambda$ of the air holes 20, an effective refractive index of a clad 22 changes, so that an effective refractive index of the waveguide mode can be changed.

When the period $\Lambda$ and the diameter d of the air holes 20 were designed at 3 μm and 1.0 μm ($d/\Lambda=0.33$), a waveguide can be provided in a single mode with respect to the wavelength of 1,064 nm. Since the photonic fiber has the features of having a capability of maintaining polarization and being free from wavelength dispersion, the photonic fiber is useful as an optical component used in the ultrashort pulsed laser device. Particularly, when the photonic fiber is used as the optical fiber 3 making up the ultrashort pulsed laser device of FIG. 1, a short pulse can be generated stably because the polarization can be kept and there is no wavelength dispersion generated.

Embodiment 5

Figure 6:
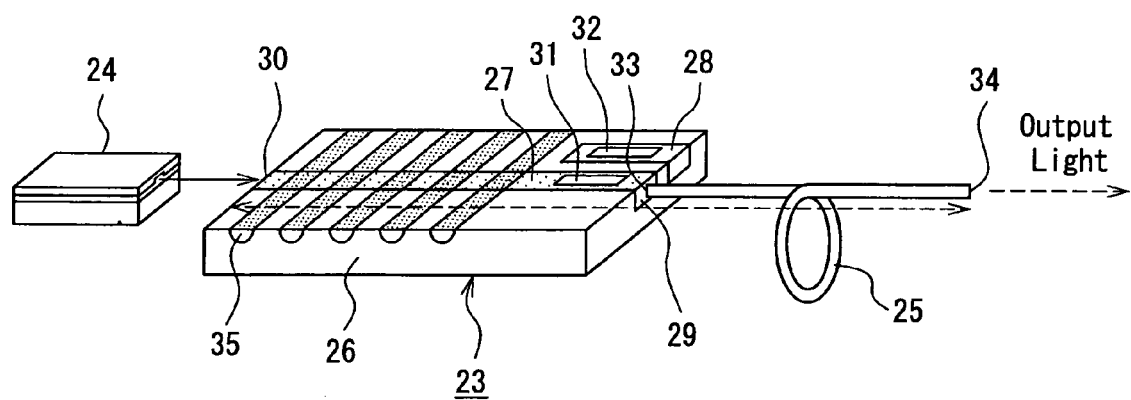
FIG. 6 schematically shows a configuration of an ultrashort pulsed laser device of Embodiment 5 of the present invention.

An ultrashort pulsed laser device of Embodiment 5 will be described below, with reference to FIG. 6. This device is configured with a waveguide solid laser medium 23 having a waveguide loss controlling function, a pump laser diode 24 and a polarization-maintaining fiber 25.

The waveguide solid laser medium 23 has a configuration in which an optical waveguide 27 and a directional coupler 28 are formed on a ferroelectric crystal substrate 26. As the ferroelectric crystal, a $LiNbO_3$ crystal may be used, for example. Since the $LiNbO_3$ crystal has a large non-linear property, it exhibits favorable wavelength conversion properties and electrooptic effects. In addition, a transition element such as Nd, which is required for laser oscillation, can be doped by thermal dispersion.

A Nd film is formed on a -Z face of the $LiNbO_3$ substrate, followed by thermal annealing in oxygen at 1,070° C. Then, the optical waveguide 27 is formed by proton exchange on the -Z face of the ferroelectric crystal substrate 26 made of Nd-doped $LiNbO_3$. Both end faces of the optical waveguide 27 are ground. The thus obtained waveguide solid laser medium 23 has a central wavelength of absorption spectrum of 814 nm and a central wavelength of fluorescence spectrum of 1,084 nm. In addition, this optical waveguide 27 has refractive index distribution only in an abnormal direction and can perform linear polarization oscillation. On a first end face 29 and a second end face 30 of the waveguide solid laser medium 23, an anti-reflection coat with respect to the wavelength of 1,084 nm and a high reflectance coat with respect to the wavelength of 1,084 nm, respectively, are formed.

The directional coupler 28 formed on the waveguide solid laser medium 23 imparts a waveguide loss controlling function. When an electric field is applied to electrodes 31 and 32 formed on the optical waveguide 27 and the directional coupler 28, an effective refractive index inside the optical waveguide 27 changes so that light couples with an optical waveguide of the adjacent directional coupler 28. By exploiting this, a loss of the optical waveguide 27, i.e., a loss of the resonator, can be changed.

A coating is formed similarly to the polarization-maintaining fiber 25 also, and on a first end face 33a and a second end face 34, an anti-reflection coat with respect to the wavelength of 1,084 nm and a high reflectance coat with respect to the wavelength of 1,084 nm, respectively, are formed. The second end face 34 has a transmittance of 5%, for example, so as to function as an output mirror.

The resonator with respect to the wavelength of 1,084 nm, which is an oscillation wavelength, is formed with the second end face 29 of the waveguide solid laser medium 23 and the second end face 34 of the polarization-maintaining fiber 25. In the ultrashort pulsed laser device of FIG. 6, the optical waveguide 27 of the waveguide solid laser medium 23 and the polarization-maintaining fiber 25 are optically coupled directly without the use of a lens system, where the first end face 33 of the polarization-maintaining fiber 25 opposes the first end face 29 of the waveguide solid laser medium 23.

Light emitted from the pump laser diode 24 optically couples with the second end face 30 of the waveguide solid laser medium 23 so as to pump the waveguide solid laser medium 23 optically. Resonance of light with the wavelength of 1,084 nm occurs between the second end face 30 of the waveguide solid laser medium 23 and the second end face 34 of the polarization-maintaining fiber 25. At the same time, by applying a voltage at a period of 100 MHz to the electrodes 31 and 32, when a length of the polarization-maintaining fiber 25 is 1.5 m, mode lock oscillation occurs.

In an example according to this embodiment, 150 mW out of 200 mW of the laser power of the pump laser diode 24 coupled with the optical waveguide 27 of the waveguide solid laser medium 23. Then, the light of 1,084 nm was obtained at an average power of 10 mW from the second end face 34 of the polarization-maintaining fiber 25. In addition, the mode lock was obtained at the frequency of 100 MHz, where the pulse width was 500 fs and the peak power was 200 W.

In order to obtain higher-powered pulsed light, it is effective to pump the waveguide solid laser medium 23 from a lateral direction. In this case, a slab-type high-powered laser diode can be used as the pumping light.

As stated above, the use of the waveguide solid laser medium integrally equipped with the waveguide loss controlling function and the optical fiber allows a frequency of the mode lock to be set at 100 MHz, from which a high peak power can be obtained. Thereby, a compact ultrashort pulsed laser device having a high peak power, which is suitable as a light source for three-dimensional bit-by-bit recording, can be obtained.

Moreover, since the ferroelectric crystal substrate 26 is used as the substrate of the solid laser medium, a periodically reversed polarization configuration and the like can be formed, whereby it can function as a wavelength conversion element also. As is well-known, a corrugated electrode is formed on a surface of a substrate and an electric field is applied thereto, whereby periodically reversed polarization 35 as shown in FIG. 6 can be formed so as to be orthogonal to the optical waveguide 27. By setting the reversed period at 6.4 μm, phase matching can be obtained with respect to the wavelength of 1,084 nm, whereby ultrashort pulsed light of 532 nm can be generated. When ultrashort pulsed light of visible light is used for three-dimensional optical recording, a highly sensitive material can be selected.

In the above-stated configuration, although the pump laser diode 24 is optically coupled directly with the optical waveguide 27 of the waveguide solid laser medium 23, the optical fiber 25 may be interposed therebetween so that pumping light couples with an end face of the optical fiber and an end face of the optical waveguide 27 of the waveguide solid laser medium 23 functions as an output mirror. In this case, since a distance between the pump laser diode 24 and the waveguide solid laser medium 23 increases, the stability of modulation properties and wavelength conversion properties of the waveguide solid laser medium 23 can be enhanced.

Embodiment 6

An ultrashort pulsed laser device of Embodiment 6 adopts a red laser diode (670 nm) as the pump laser diode 1 in the configuration of FIG. 1, Cr: LiSAF as the solid laser medium 2 and a photonic fiber as the optical fiber 3.

As the red laser diode, an AlGaInP based high-powered red laser (wavelength: 670 nm) may be used, for example. Laser light couples with the optical fiber 3 composed of the photonic fiber via a pair of lenses 6. The photonic fiber is designed so that propagation in a single mode is carried out with respect to wavelengths of 670 nm and 850 nm, by which polarization can be maintained and wavelength dispersion becomes zero. On an incident end face of the photonic fiber, an anti-reflection coat with respect to a 670-nm band and a high reflectance coat with respect to an 850-nm band as an oscillation wavelength are formed. Light transmitted through the optical fiber 3 is emitted from a second end face 8 as an outgoing end face so as to pump Cr: LiSAF as the solid laser medium 2. On the second end face 8 of the optical fiber 3, an anti-reflection coat with respect to an 850-nm band is formed. A laser resonator is formed with a saturable absorber mirror 4 and a first end face 7 as an incident end face of the optical fiber 3. The saturable absorber mirror 4 is designed as adaptable to a wavelength of an 850 nm band.

In an example according to this embodiment, 150 mW out of 200 mW of the power of the red laser diode as the pump laser diode 1 coupled with the photonic fiber as the optical fiber 3. Then, the light of 850 nm was obtained at an average power of 30 mW from the saturable absorber mirror 4. In addition, the mode lock was obtained at the frequency of 100 MHz, where the pulse width was 500 fs and the peak power was 600 W.

As stated above, the ultrashort pulsed laser device in each of the embodiments of the present invention includes a pump laser diode having linear polarization, a polarization-maintaining optical fiber, a solid laser medium that oscillates with a linear polarization and a saturable absorber mirror. Alternatively, instead of a combination of the solid laser medium and the saturable absorber mirror, a waveguide solid laser medium having a waveguide loss controlling function may be used.

Thereby, a resonator length can be set at 1 m or more with a compact configuration, short pulsed light of picoseconds or shorter can be generated with respect to a repetition frequency of 100 MHz because the mode lock occurs, and about 1 kW of a peak power can be obtained easily.

In addition, the use of a solid laser medium oscillating with linear polarization and an optical fiber maintaining polarization allows a polarization direction of laser light oscillating in a resonator to be preserved as linear polarization. This is advantageous for the mode lock and a high peak power can be obtained because of stable and high-efficiency oscillation. Therefore, the ultrashort pulsed laser device of each embodiment is suitable for a light source for three-dimensional bit recording.

Embodiment 7

An optical head of Embodiment 7 will be described below, with reference to FIG. 7. This optical head is configured with the ultrashort pulsed laser device shown in FIG. 3 and is applicable to an optical information processor such as an optical recording/reproducing apparatus.

Figure 7:
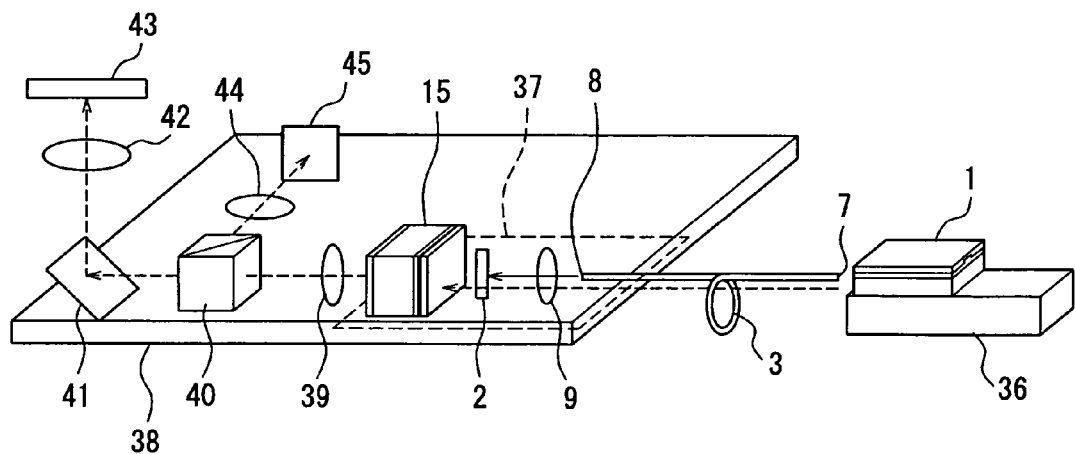
FIG. 7 schematically shows a configuration of an optical head of Embodiment 7 of the present invention.

In FIG. 7, laser light emitted from a pump laser diode 1 directly couples with an optical fiber 3 without a lens system interposed therebetween. The pump laser diode 1 and the optical fiber 3 are packaged on a Si submount and the Si submount is fixed to a heat sink mount 36. Laser light emitted from the optical fiber 3 is collected by a lens 9 to pump a solid laser medium 2. A laser resonator is composed of a first end face 7 of the optical fiber 3 and a saturable absorber mirror 15. The saturable absorber mirror 15 has a reflectance set at 95% and is used as an output mirror. An output unit 37 from a second end face 8 of the optical fiber 3 to the saturable absorber mirror 15 is fixed to an optical head mount 38.

Ultrashort pulsed light (1,064 nm) emitted from the saturable absorber mirror 15 is collimated by a lens 39 and is collected onto an optical disc 43 as a recording medium by an optical system including a beam splitter 40, a mirror 41 and an objective lens 42. Light reflected from the optical disc 43 is introduced to a detector 45 by an detection optical system 44 for the purpose of servo detection and reproduction signal detection.

In this embodiment, the optical fiber 3 is placed between the saturable absorber mirror 15 arranged in the output unit 37 and the pump laser diode 1. Then, the pump laser diode 1 and the output unit 37 are fixed to different mounts, i.e., the heat sink mount 36 and the optical head mount 38. Therefore, a portion of the elements constituting the optical head that is provided on the optical head mount 38 can be designed as compact and lightweight. As a result, the optical head mount 38 can be moved similarly to the optical head used for a CD and a DVD, so as to perform servo control.

In addition, heat generated from the pump laser diode 1 can be dissipated to the heat sink mount 36, which facilitates the heat sink design of the optical head.

Figure 8:
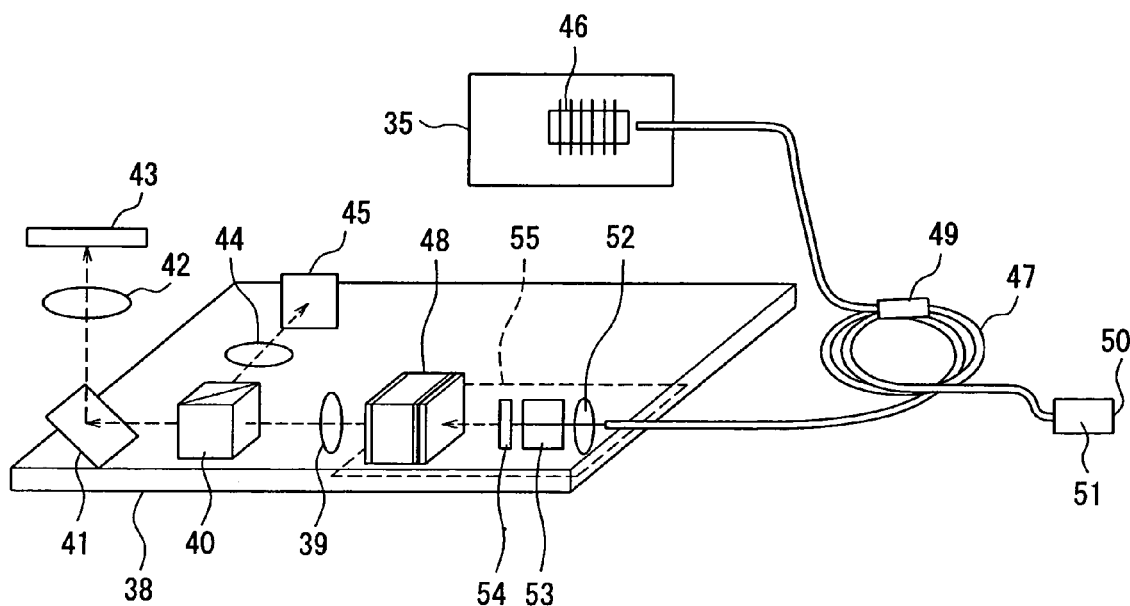
FIG. 8 schematically shows a configuration of an optical head of Embodiment 7 of the present invention.
Figure 9:
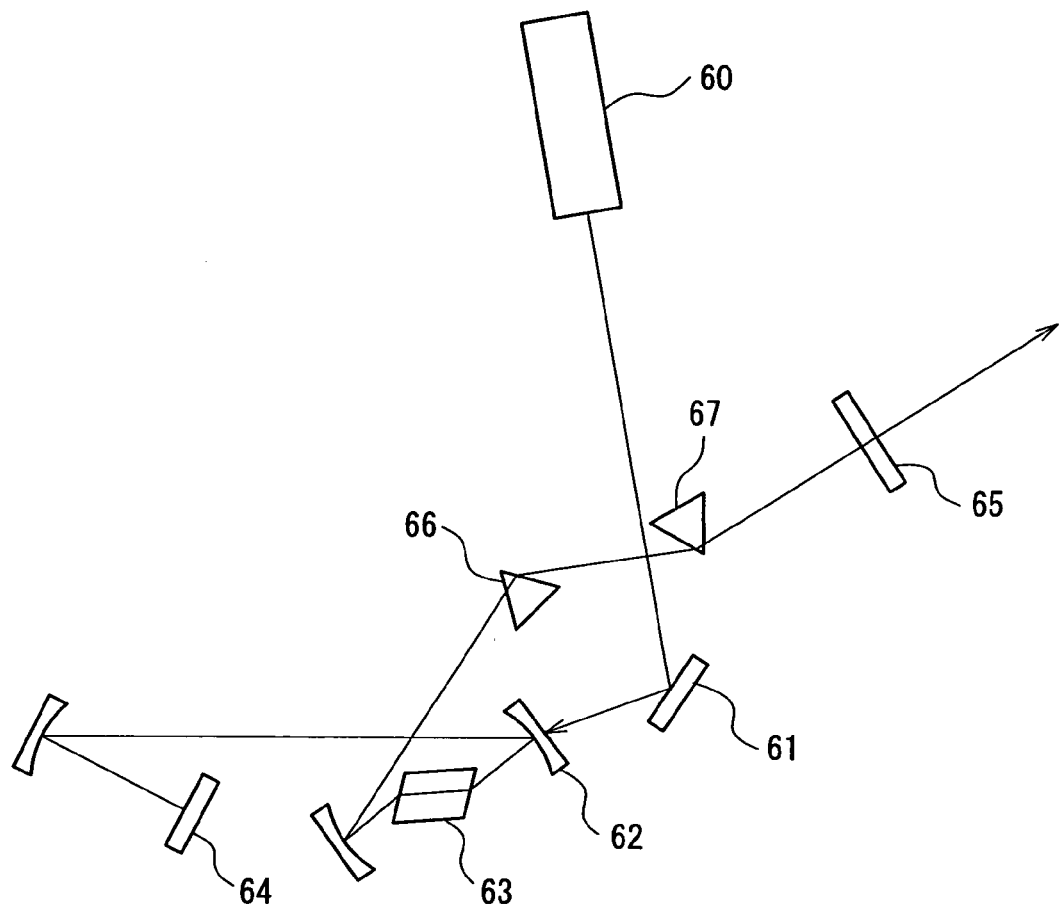
FIG. 9 schematically shows a configuration of the conventional femtosecond laser.

Instead of the above-stated configuration, as shown in FIG. 8, a similar optical head can be constituted so that an ultrashort pulsed laser device includes as main elements a pump laser diode 46, an optical fiber 47 to which a transition element is doped and a saturable absorber mirror 48 is packaged thereon, from which similar effects can be obtained. For instance, as the pump laser diode 46, a 980-nm band InGaAs laser diode may be used, and as the optical fiber 47, an optical fiber to which Er and Yb are doped may be used.

Laser light emitted from the pump laser diode 46 couples with the Er doped optical fiber 47 by means of a coupler 49. A Faraday rotator 51 is attached to one end face 50 of the Er doped optical fiber 47. Laser light pumped by the Er doped optical fiber 47 and emitted from the other end face of the optical fiber is collected by a lens 52 so as to pass through a Faraday rotator 53 and a wave plate 54 and is reflected from the saturable absorber mirror 48. A laser resonator is composed of the saturable absorber mirror 48 and the end face 50 to which the Faraday rotator 51 is attached. The saturable absorber mirror 48 has a reflectance set at 95% and is used as an output mirror. An output unit 55 including the saturable absorber mirror 48 is fixed to an optical head mount 38.

Similarly to the optical head of FIG. 7, short pulsed light (1,560 nm) emitted from the saturable absorber mirror 48 is collected onto an optical disc 43 as a recording medium by an optical system including an objective lens 42, and light reflected from the optical disc 43 is introduced to a detector 45 and is used for servo detection and reproduction signal detection.

In the configuration of this embodiment, the Er doped optical fiber 47 is placed between the saturable absorber mirror 48 arranged in the output unit 55 and the pump laser diode 46. Then, the pump laser diode 46 and the output unit 55 are fixed to different mounts, i.e., the heat sink mount 36 and the optical head mount 38. Therefore, a portion of the elements constituting the optical head that is provided on the optical head mount 38 can be designed as compact and lightweight.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An ultrashort pulsed laser device, comprising:
a pump laser diode having linear polarization;
a solid laser medium oscillating with linear polarization;
an optical fiber maintaining a polarization direction; and
a saturable absorber mirror,
wherein the solid laser medium is disposed between the optical fiber and the saturable absorber mirror,
laser light emitted from the pump laser diode optically is coupled with a first end face of the optical fiber, and laser light emitted from a second end face of the optical fiber pumps the solid laser medium, and
the first end face of the optical fiber and the saturable absorber mirror constitute a laser resonator.

2. The ultrashort pulsed laser device according to claim 1, wherein a dielectric multilayer film is formed on the first end face of the optical fiber, the dielectric multilayer film having a low reflectance with respect to light from the pump laser diode and having a high reflectance with respect to light oscillating in the laser resonator.

3. The ultrashort pulsed laser device according to claim 1, wherein the optical fiber is a photonic fiber.

4. The ultrashort pulsed laser device according to claim 1, wherein the solid laser medium is composed of Nd:YVO$_4$, Nd:GdVO$_4$ or Cr:LiSAF.

5. An optical head, comprising the ultrashort pulsed laser device according to claim 1,
wherein the ultrashort pulsed laser device is provided with a power output unit, and the optical fiber is disposed between the power output unit and the pump laser diode, and the pump laser diode is fixed to a heat sink mount and the power output unit is fixed to an optical head mount that is provided separately from the heat sink mount.

6. The optical head according to claim 5, wherein the power output unit is the saturable absorber mirror.

7. An optical information processor for recording and reproducing information with respect to a recording medium, comprising:

the optical head according to claim 5;

an optical system for introducing light emitted from the short pulsed laser in the optical head to the recording medium; and an optical system for detecting light reflected from the recording medium.

* * * * *